(12) United States Patent
Haverkamp (10) Patent No.: US 7,172,253 B2
(45) Date of Patent: Feb. 6, 2007

(54) VEHICLE SEAT

(75) Inventor: Michael Haverkamp, Hannover (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 11/284,898

(22) Filed: Nov. 23, 2005

(65) Prior Publication Data

US 2006/0119158 A1   Jun. 8, 2006

(30) Foreign Application Priority Data

Nov. 24, 2004   (DE) ...................... 10 2004 056 507

(51) Int. Cl.
  *B60N 2/48*    (2006.01)
(52) U.S. Cl. .............................. 297/378.1; 297/378.12; 297/378.13; 297/354.1
(58) Field of Classification Search ............. 297/378.1, 297/378.12, 378.13, 378.14, 354.1
  See application file for complete search history.

(56) References Cited

U.S. PATENT DOCUMENTS

| 5,052,748 | A  | * | 10/1991 | Fourrey et al. .............. 297/124 |
| 5,522,643 | A  | * | 6/1996  | Matsuura ..................... 297/367 |
| 5,820,218 | A  | * | 10/1998 | Baloche et al. .............. 297/367 |
| 6,149,235 | A  | * | 11/2000 | Fahim ...................... 297/259.2 |
| 6,328,381 | B1 | * | 12/2001 | Smuk ......................... 297/365 |
| 6,739,668 | B2 | * | 5/2004  | Coman et al. ......... 297/378.12 |
| 6,880,888 | B2 | * | 4/2005  | Rabbach et al. ....... 297/378.12 |
| 6,905,173 | B2 | * | 6/2005  | Tame et al. ............ 297/378.12 |
| 7,017,995 | B2 | * | 3/2006  | De Nichilo ............ 297/378.14 |
| 7,021,716 | B2 | * | 4/2006  | Persad et al. .......... 297/378.12 |
| 2003/0001419 | A1 | * | 1/2003 | Roth et al. ............... 297/378.1 |

FOREIGN PATENT DOCUMENTS

| DE | 42 01 829 A1 | 6/1993 |
| DE | 198 82 413 T1 | 5/2000 |
| WO | 99/38723 | 8/1999 |

* cited by examiner

*Primary Examiner*—Peter M. Cuomo
*Assistant Examiner*—Erika Garrett
(74) *Attorney, Agent, or Firm*—Shlesinger, Arkwright & Garvey LLP (57) ABSTRACT

Vehicle seat includes seat frame, an articulated backrest frame lockable by an angle adjuster adjustable between an upright basic position, a partially forwardly-folded easy-entry position, and a completely forwardly folded cargo position. A release shaft is pivotable by a release lever to release the angle adjuster. The backrest frame can only be moved out of the basic position into the cargo position by being folded forward into the easy-entry position, locked by resetting the release lever, then unlocked by actuating the release lever and folded forward into cargo position. An easy-entry mechanism includes the following: control cams on the backrest frame with an easy-entry stop, a locking hook articulated to the seat frame to engage the easy-entry stop, and a pushrod eccentrically articulated to the release shaft that, when the backrest is folded forward, is initially in an inactive position, and then releases the locking hook in an active position.

10 Claims, 7 Drawing Sheets

VEHICLE SEAT

CROSS-REFERENCE TO RELATED APPLICATION

This claims the priority of German application no. 10 2004 056 507.4, filed Nov. 24, 2004, which is incorporated herein by reference.

FIELD OF THE INVENTION

The invention relates to a vehicle seat of the type including a seat frame, a backrest frame articulated to the seat frame and lockable in a seat angle adjuster, and a release shaft running along a backrest swivel axis, and being pivotable by a release lever to release the seat angle adjusters. More particularly, the invention relates to a vehicle seat of this type which further includes that the backrest frame is adjustable between an upright basic or use position, a partially forwardly folded easy-entry position, and a completely forwardly folded cargo position after releasing the seat angle adjusters.

BACKGROUND OF THE INVENTION

The angle of a vehicle seat disclosed in WO 99/38723 A1 can be adjusted within a comfort zone from a basic or use position with an essentially upright backrest. After the backrest angle adjuster is released, the backrest is partially folded forward into an easy-entry position, or completely into a cargo position. WO 99/38723 A1 provides a first and second Bowden wire to release the angle adjusting device, and each Bowden cable can be actuated by a handle on the backrest. The first Bowden cable serves to adjust to the angle of the backrest when a passenger is in the vehicle seat, and the second Bowden cable is used to set the easy-entry position by pivoting an unlocking lever or release lever on a release shaft.

DE 198 82 413 T1 and DE 42 01 829 A1 disclose vehicle seats that can be moved into an easy-entry position or a position that enables easier access. Usually, the locked lengthwise movement of the vehicle seat is simultaneously released to increase access to the rear row of seats.

In such systems, handles or levers are generally provided for the different positions which can cause user confusion and potential mistakes requiring an inconvenient resetting of the vehicle seat.

OBJECTS AND SUMMARY OF THE INVENTION

An object of the invention is to create a vehicle seat that overcomes the drawbacks of the prior art.

Another object of the invention is to create a vehicle seat that enables selective displacement into the three above-cited positions and that can be employed in a user-friendly manner without requiring a great deal of prior knowledge.

This object is accomplished by a vehicle seat including a seat frame, and a backrest frame articulated to the seat frame and lockable by seat angle adjusters. The vehicle seat may further include a release shaft provided and running along a backrest swivel axis, and being pivotable by a release lever to release the seat angle adjusters. The backrest frame may be adjustable between an upright basic position, a partially forwardly folded easy-entry position, and a completely forwardly folded cargo position after releasing the seat angle adjusters. The backrest frame can only be moved out of the upright basic position into the cargo position by being folded forward into the easy-entry position, subsequently locked by resetting the release lever, then unlocked by actuating the release lever, and then folded forward into the cargo position. A control cam may be provided on the backrest frame and include an easy-entry stop. An adjustable locking hook, spring biased against the control cam, may be affixed to the seat frame, the locking hook contacting the easy-entry stop when the backrest frame is folded forward into the easy-entry position and blocking the backrest frame in the easy-entry position. A pushrod may be eccentrically articulated to the release shaft, the pushrod first advancing into an inactive position after the backrest frame is folded forward out of the use position in the easy-entry position, the pushrod does not release the locking hook when in the inactive position, and the pushrod moves into an active position after the release lever is reset and subsequently actuated in which it releases the locking hook.

These and other objects are accomplished by a vehicle seat including the additional features set forth below.

According to the invention, only one lever is provided for the basic or comfort position, the easy-entry position and cargo position. The lever releases the seat angle adjuster, and makes it easy to securely set the easy-entry position and cargo position. The initial actuation of the release lever is for the comfort setting in which the backrest swings, pivots, or folds within the comfort range and can be folded forward into the easy-entry position. An easy-entry mechanism is provided between the seat frame and backrest frame. When the release lever is actuated, the easy-entry mechanism first provides an easy-entry stop into which an adjustable seat-frame-side locking hook engages so that the user cannot swing the backrest too far forward. On the other side of the vehicle seat, additional engaging means can be provided to release the lengthwise locking of the seat.

To move the backrest into cargo position, the user must then first reset or release the release lever since the engagement of the seat-frame-side locking hook can only be released by reactuating the release lever. The backrest can be advantageously returned from cargo position to basic position without any hindrance in a single step.

To achieve this function, a control cam according to the invention is provided on the backrest frame with an easy-entry stop in which the locking hook articulated to the seat frame engages and accordingly blocks further forward movement. The locked locking hook is released according to the invention when the release lever is released from the locked easy-entry position by a pushrod that is offset or eccentrically seated on the release shaft. After the backrest is partially folded forward, the pushrod first assumes an inactive position from which it is transferred into an active position after the release lever is first reset and then reactuated. In this position, it releases the locking lever so that the backrest can be a folded forward into the cargo position.

Instead of a guide roller, a backrest-side guide surface can be provided on which the pushrod glides. The release lever can also be actuated by a handle or a Bowden cable provided in the top of the backrest.

Relative terms such as left, right, up, and down are for convenience only and are not intended to be limiting.

An embodiment of the invention will be explained below with reference to the accompanying drawings.

BRIEF DESCRIPTION OF THE DRAWINGS

FIG. 1 shows the backrest in locked basic position according to the invention;

FIG. 2 shows the unlocked backrest folded forward into easy-entry position according to the invention;

FIG. 3 shows the easy-entry position after locking the seat angle adjuster by releasing the release lever according to the invention;

FIG. 4 shows subsequent release of the easy-entry position by actuating the release lever according to the invention;

FIG. 5 shows the cargo position achieved by subsequently folding the backrest forward and releasing the release lever according to the invention;

DETAILED DESCRIPTION OF THE INVENTION

Figure 7:
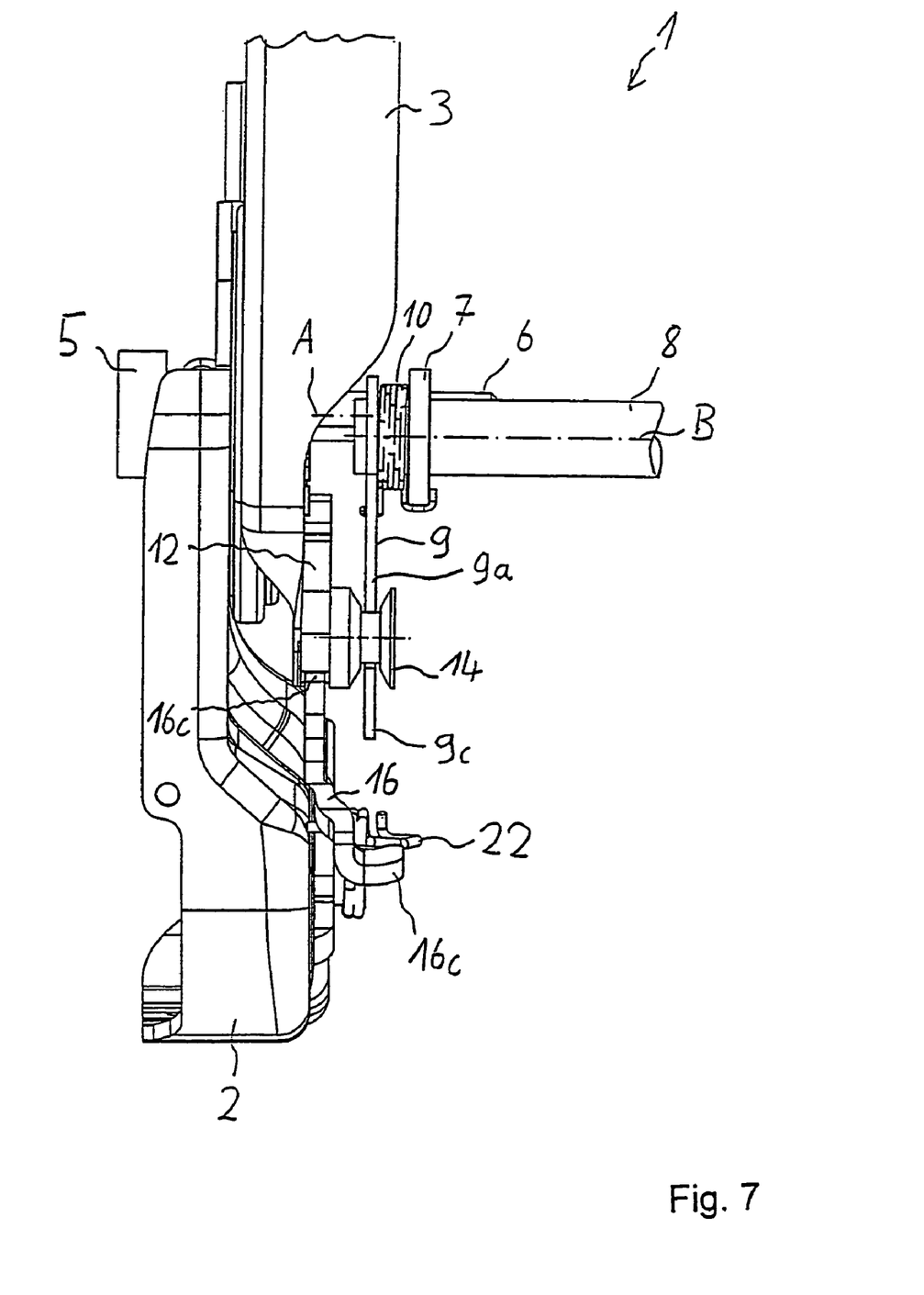
FIG. 7 shows rear view of the locked basic position from FIGS. 1 and 6.

A vehicle seat 1 includes a seat frame 2 and a backrest frame 3 articulated to the seat frame 2 on a backrest swivel axis A. The backrest frame may be provided on axis A and lockable in its foldable or swivelable positions to the seat frame 2 by a known backrest angle adjuster 4 (not shown in detail). To release the backrest angle adjuster 4, a release lever 5 is provided on the outside of the seat, i.e., on the left in FIG. 7, that is on a release shaft 6 lying in the backrest swivel axis A and extending through the seat frame 2 and backrest frame 3. Unillustrated springs of the backrest angle adjuster 4 move the release lever 5 from its unactuated position in FIGS. 1, 3 downward into its locked position. When the release lever 5 is pivoted up, stops or stop blocks, for example, in the angle adjusters 4 are displaced so that the backrest frame 3 is unlocked or released, and can be adjusted within a comfort range. In this regard, the backrest frame 3 can be biased in a forward direction and, for example, be adjusted or positioned by the user by providing a counter-pressure with his back.

Figure 1:
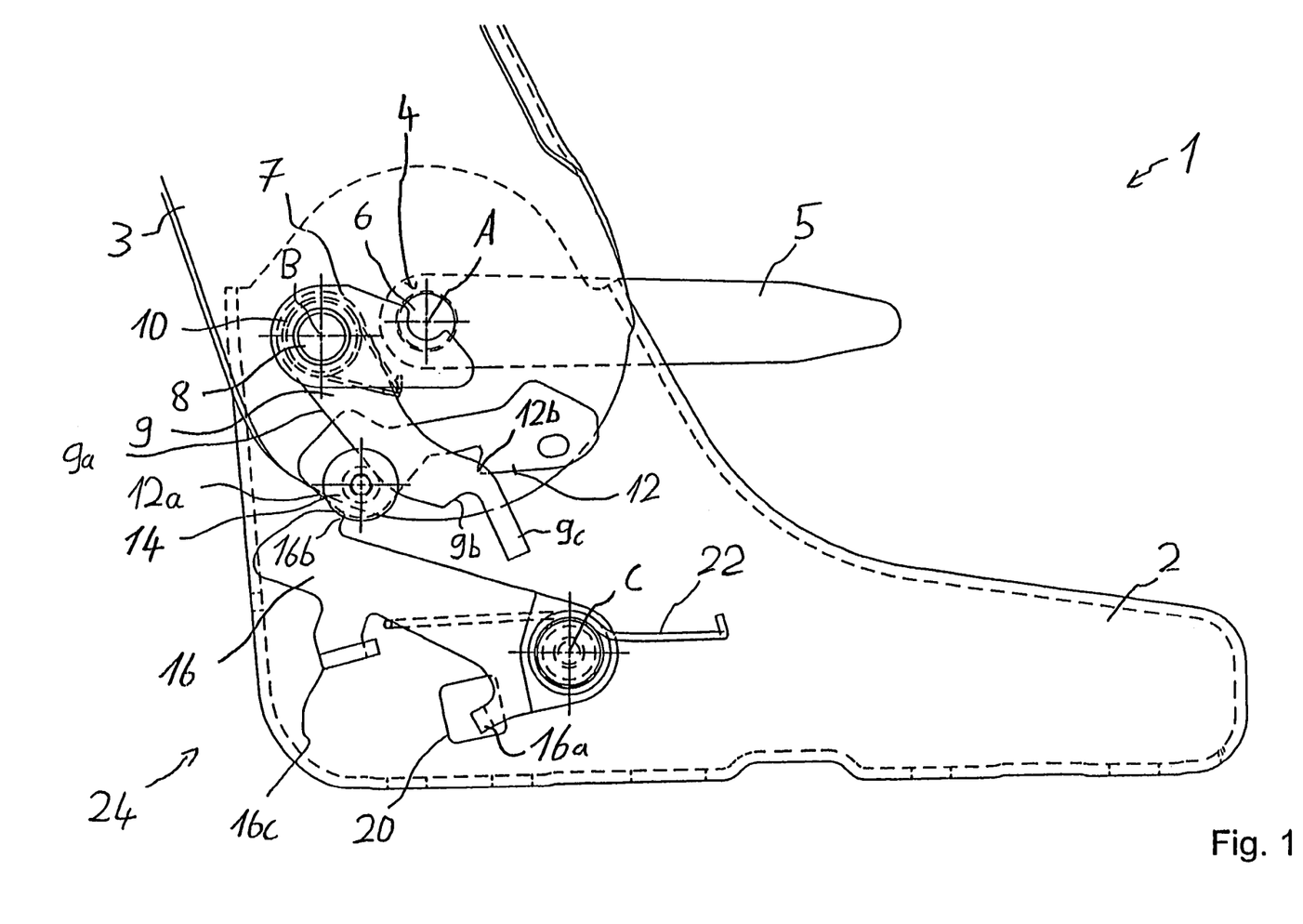
FIGS. 1–5 show side views and phantom views from the inside to the left connecting area of the backrest on the seat frame when moving from the basic position to the cargo position according to the invention.
Figure 2:
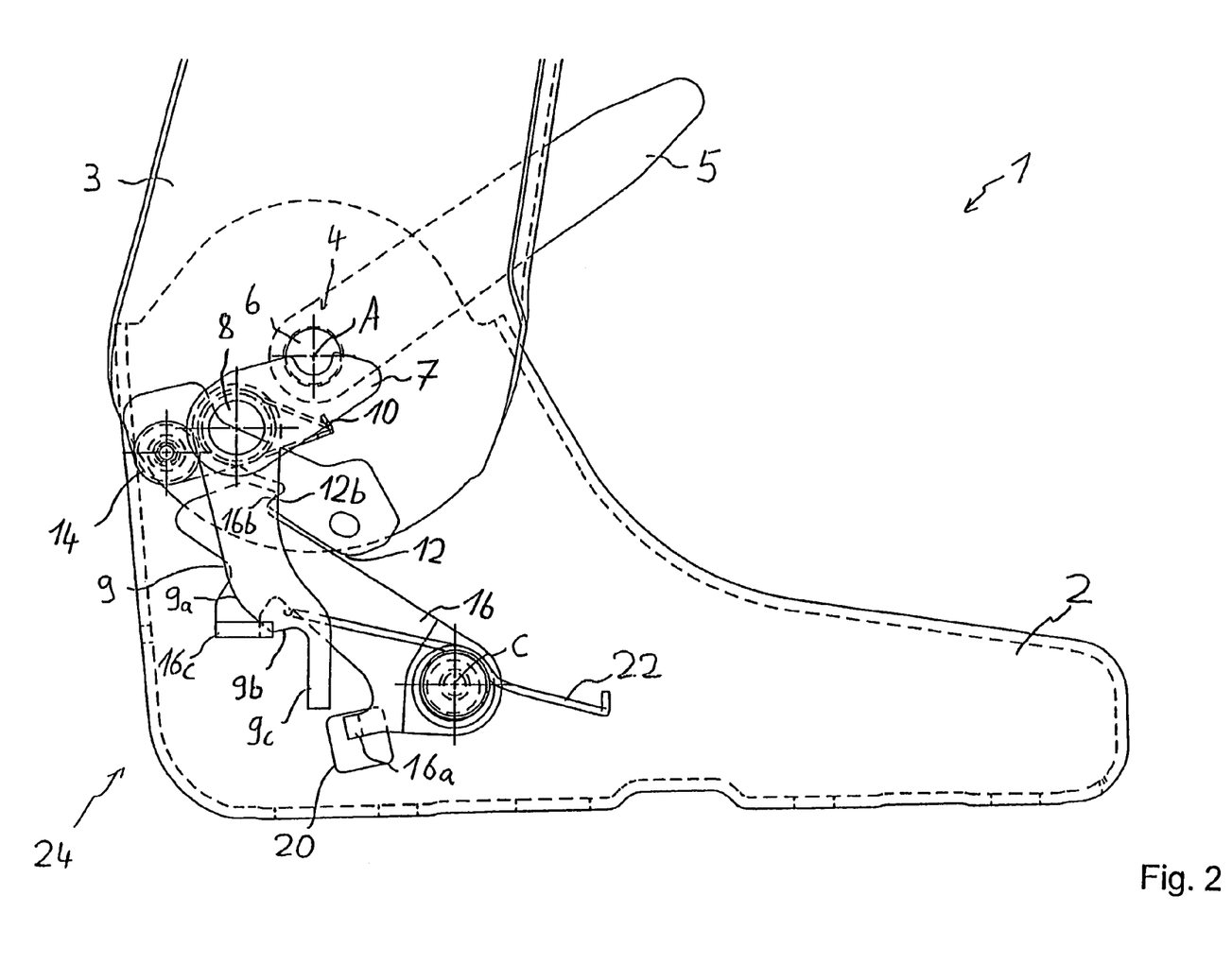
Figure 3:
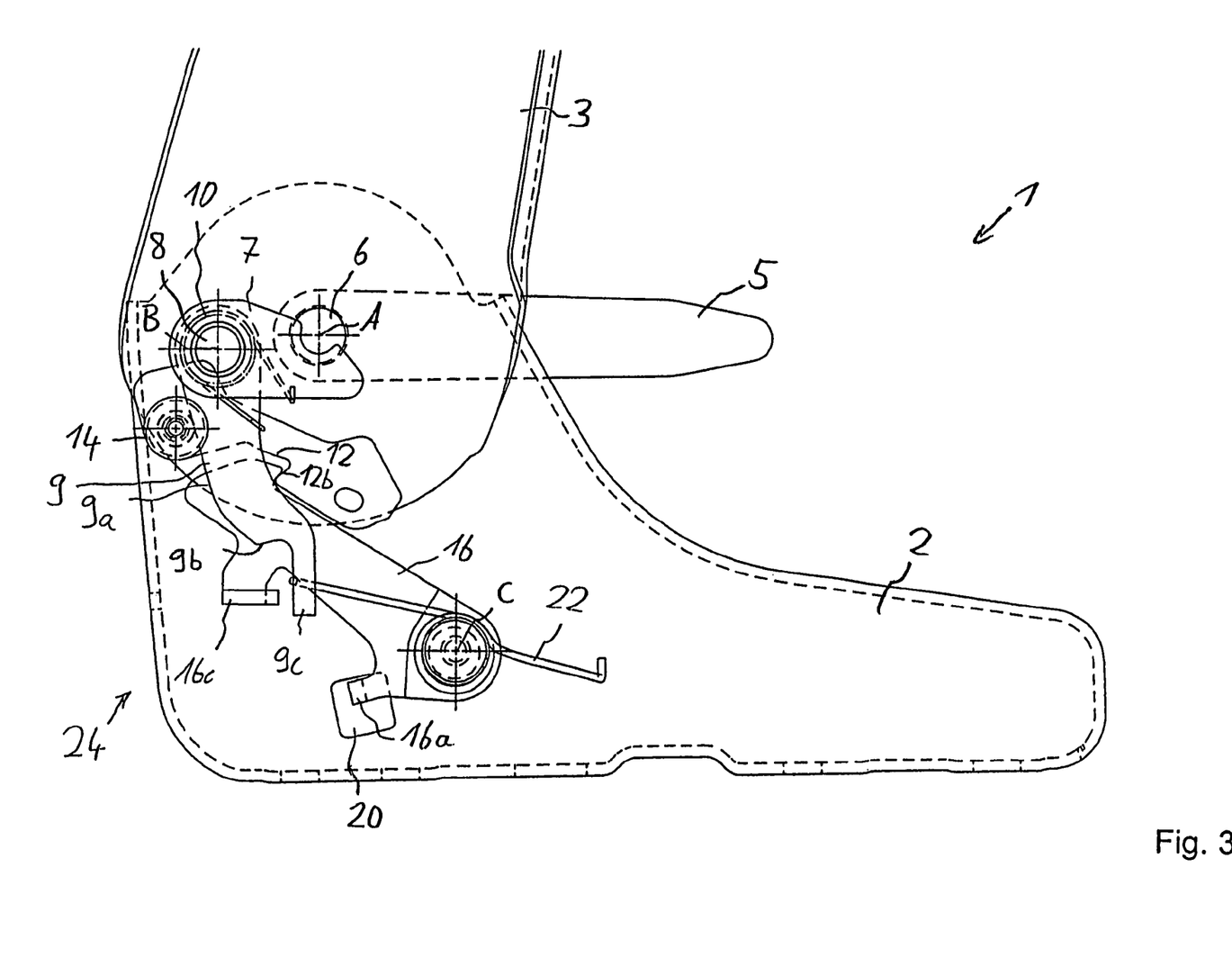

On the inside of the seat, a shackle 7 is welded onto the release shaft 6, and the shackle projects rearwardly from the release shaft 6 in the locked position of FIGS. 1 and 3 when the release lever 5 is lowered. A connecting pipe 8 is affixed to the shackle 7 eccentric to the backrest swivel axis A and is accordingly pivoted when the release lever 5 is actuated. The connecting pipe 8 serves to link the two angle adjusters 4 on the illustrated left side of the vehicle seat 1 and on the unillustrated right side so that the angle adjuster is also released on the right side when the release lever 5 is actuated or pivoted upward. A pushrod 9 is also pivotally mounted on a swivel axis B on the connecting pipe 8 and biased rearwardly by a spring 10 around connecting pipe 8, i.e. biased clockwise in FIGS. 1 to 5. On the inside of the backrest frame 3, there is a control cam 12 provided under the backrest pivot axis A, for example a component screwed or riveted to the backrest frame 3. The control cam 12 has a rear, essentially convex curved area 12a and a front easy-entry stop 12b, as viewed in the direction of travel. Furthermore, a guide roller 14 is affixed to the backrest frame 3, e.g. on the component of the control cam 12, and the guide roller projects axially toward the inside of the seat. In the basic position shown in FIG. 1, the pushrod 9 extends forwardly and downwardly, and its rear edge 9a lies against the guide roller 14 so that, when the release lever 5 pivots, its rear edge 9a rolls on the guide roller 14 affixed to the backrest.

Furthermore, a locking hook 16 is articulated or pivotably attached to the seat frame 2 in a hook axis C below the backrest frame 3. Its pivot angle or angle of rotation is limited by a control window 20 in the seat frame 2 through which its lever 16a extends in an axial direction. When the locking hook 16 is biased upwardly, i.e. clockwise in FIGS. 1 to 5 by a spring 22 anchored to the seat frame 2, the hook projection 16b of the locking hook presses against the control cam 12.

Components 6 to 22 form an easy-entry control mechanism 24 that enables the vehicle seat 1 to be adjusted from the use position of FIG. 1 to the easy-entry position of FIG. 3 and subsequently into the cargo position of FIG. 5 by using a single handle, i.e. the release lever 5 that also serves to release the seat angle adjuster 4. This adjustment will be described below:

The adjustment into the easy-entry position occurs by actuating or pivoting up the release lever 5 and partially swinging or folding the released backrest frame 3 into the easy-entry position of FIG. 2. This folding movement causes the hook projection 16b of the locking hook 16 to slide on the control cam 12. During the initial pivoting within the comfort range, it remains on the rear convex curved area 12a of the control cam 12. As it continues to pivot forward, it contacts an easy-entry stop 12b of the control cam 12 in which it locks under spring tension and initially blocks additional forward pivoting of the backrest frame 3. As the backrest frame 3 pivots or folds forward, the spring-tensioned pushrod 9 initially pivots to the rear, as its spring 10 relaxes, and rolls along the guide roller 14. As the pivoting movement of the backrest frame 3 continues, its rear edge 9a contacts a projection 16c extending axially inward of the upward-pivoting locking hook 16 and glides on it so that it releases contact with the guide roller 14.

Once the release lever 5 is released upon reaching the easy-entry position of FIG. 2, the release lever is pulled downward into the position of FIG. 3 by the restoring force of the springs in the seat angle adjuster 4, so that the backrest frame 3 is locked in the easy-entry position. The downward-pivoting release lever 5 causes the shackle 7 with the connecting tube 8 and the pushrod 9 mounted on it to pivot upward. The rear edge 9a of the pushrod 9 contacts the guide roller 14 affixed to the backrest, and its bottom edge 9b is then positioned above the projection 16c.

Figure 4:
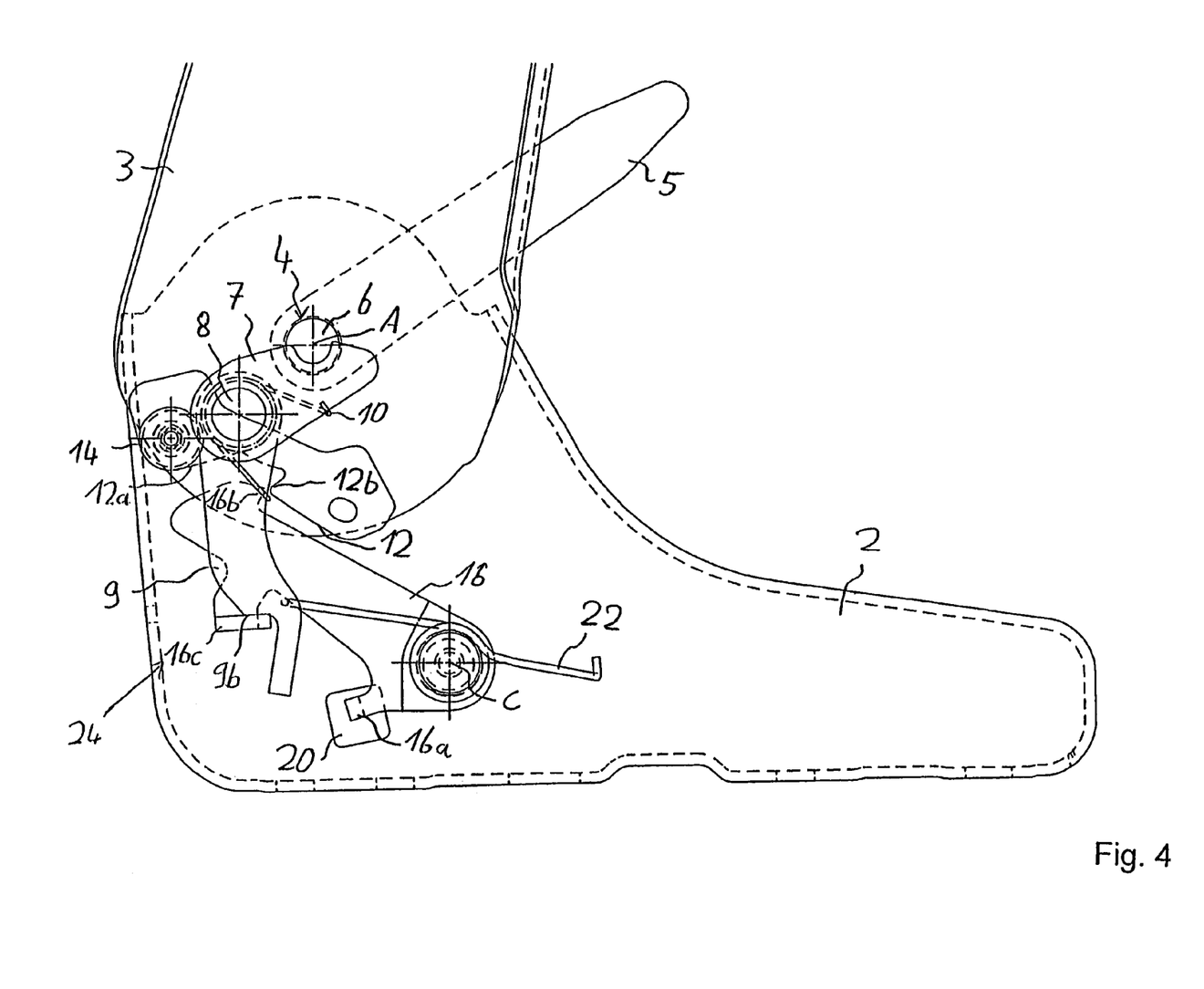

If the user wants a further adjustment of the backrest into the cargo position, he again actuates or operates the release lever 5 so that, as in FIG. 4, the shackle 7 with the connecting pipe 8 and the pushrod 9 are pivoted downward. The bottom edge 9b of the pushrod 9 presses on the projection 16c of the locking hook 16 and pivots it downward against spring tension so that its hook projection 16b disengages from the easy-entry stop 12b of the control cam 12 attached to the backrest and hence releases the backrest frame 3.

FIGS. 2 and 4 show different states of the easy-entry mechanism 24 with the locking lever 5 and backrest frame 3 at the same pivoting angle, the pushrod 9 being in an inactive position of FIG. 2 and in an active position of FIG. 4 in which it releases the locking hook 16.

The user can then subsequently fold the released backrest frame 3 forwardly into the cargo position of FIG. 5 or allow the backrest frame 3 to independently fold forwardly under its spring tension. The clockwise biased pushrod 9 is held against projection 16c of the locking hook 16 by its bottom contact region 9c extending further downward next to the bottom edge 9b, and the spring tension of the locking hook causes its lever 16a to reach the upper edge of the control window 20 as an end position.

Figure 5:
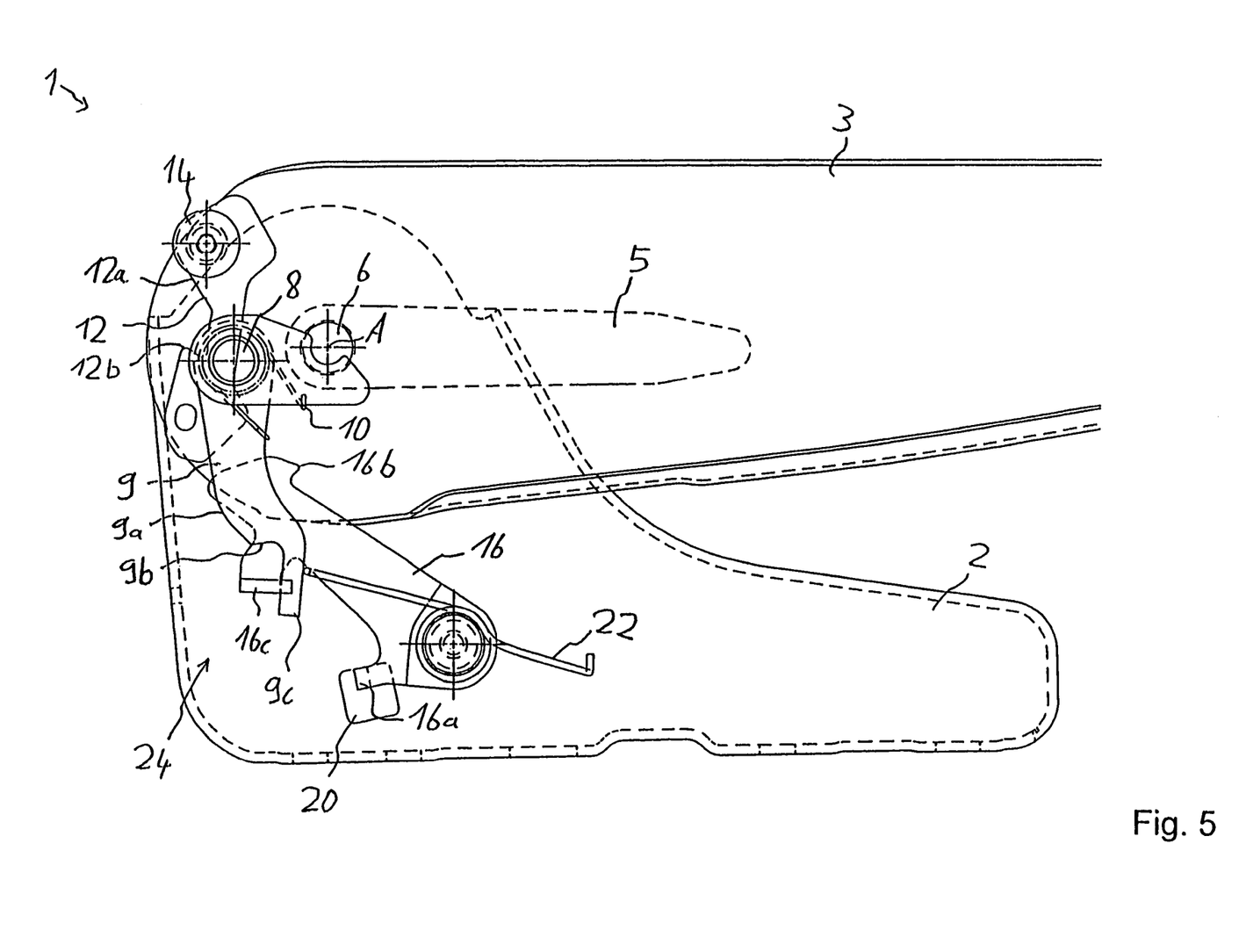
Figure 6:
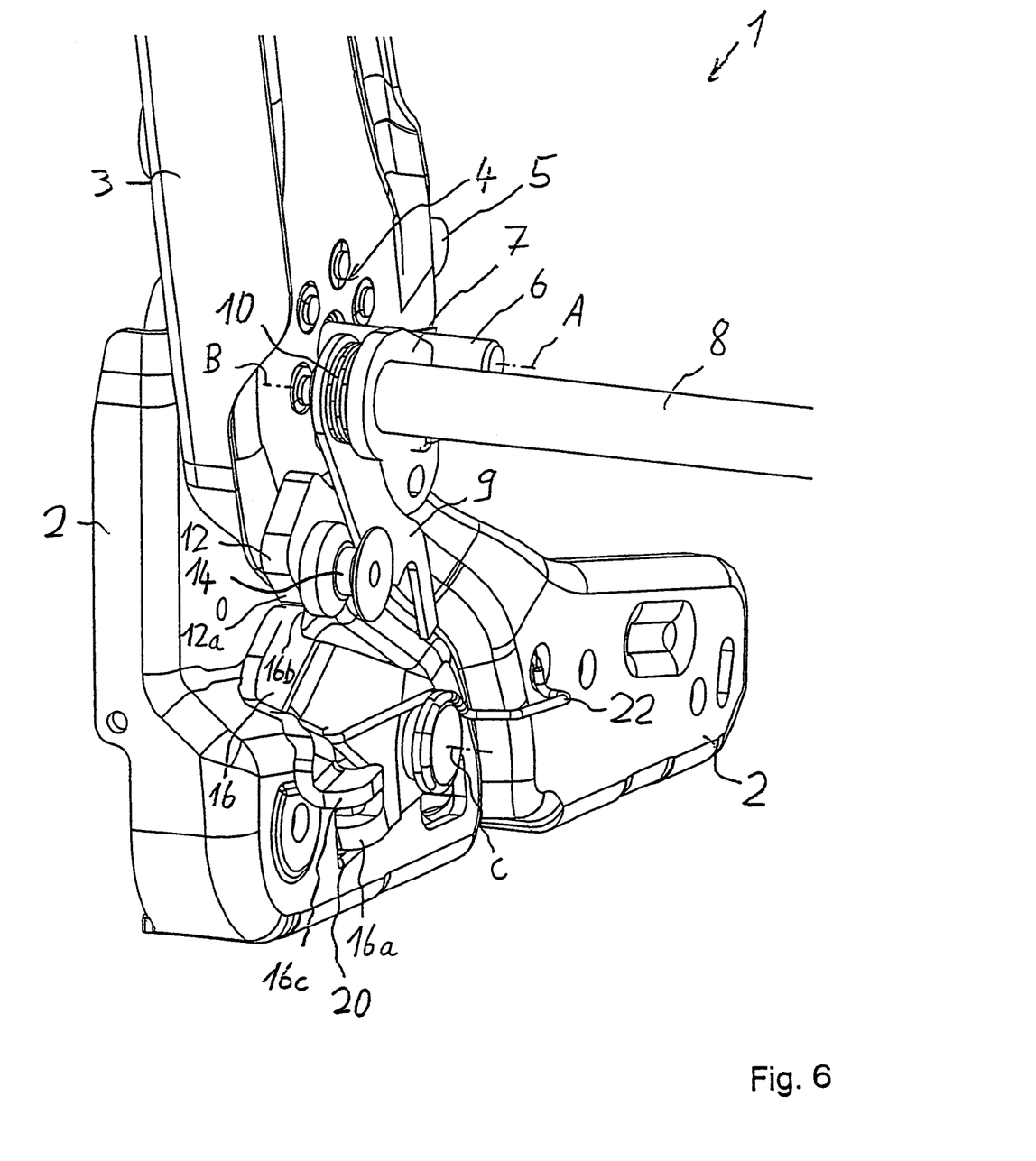
FIG. 6 shows a perspective view of the locked basic position of FIG. 1 from inside and from the rear according to the invention.

The backrest is restored or returned from the cargo position of FIG. 5 to the use position of FIG. 1 when the user first actuates the release lever 5 and releases the backrest angle adjuster 4. The pushrod 9 is again pivoted downward which, however, has no additional functional effect. As the backrest frame 3 is subsequently folded upward, the locking hook 16 glides against the control cam 12 releasing spring tension, which also has no effect since it does not lock in the control cam 12 due to the shape of the control cam 12 in this pivoting direction. The backrest with the backrest frame 3 can then be completely folded upward into the basic or use position of FIG. 1.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Vehicle seat, comprising:
   a) a seat frame;
   b) a backrest frame articulated to the seat frame and lockable in a seat angle adjuster;
   c) a release shaft being provided and running along a backrest swivel axis, and being pivotable by a release lever to release the seat angle adjuster;
   d) the backrest frame being adjustable between an upright basic position, a partially forwardly folded easy-entry position, and a completely forwardly folded cargo position after releasing the seat angle adjusters;
   e) the backrest frame can only be moved out of the upright basic position into the cargo position by being folded forward into the easy-entry position, subsequently locked by resetting the release lever, then unlocked by actuating the release lever, and then folded forward into the cargo position;
   f) a control cam provided on the backrest frame and including an easy-entry stop;
   g) an adjustable locking hook, spring biased against the control cam, and being affixed to the seat frame, and the locking hook contacts the easy-entry stop when the backrest frame is folded forward into the easy-entry position and blocks the backrest frame in the easy-entry position; and
   h) a pushrod being eccentrically articulated to the release shaft, the pushrod first advancing into an inactive position after the backrest frame is folded forward out of the use position in the easy-entry position, and the pushrod does not release the locking hook when in an inactive position, and the pushrod moves into an active position after the release lever is reset and subsequently actuated in which it releases the locking hook.

2. Vehicle seat according to claim 1, wherein:
   a) the backrest frame can be directly folded back into the basic position from the cargo position after releasing the seat angle adjuster, whereby the locking hook moves along the control cam while releasing spring tension.

3. Vehicle seat according to claim 2, wherein:
   a) the locking hook contacts the easy-entry stop by one of rolling and gliding along the control cam while releasing spring tension.

4. Vehicle seat according to claim 1, wherein:
   a) the locking hook is articulated to the seat frame and has a projection against which the pushrod presses when in the active position.

5. Vehicle seat according to claim 4, wherein:
   a) the pushrod contacts the projection when the backrest frame is folded forward from the basic position to the easy-entry position, and the pushrod slides along the projection until it reaches an inactive position.

6. Vehicle seat according to claim 4, wherein:
   a) the pushrod includes a bottom contact area, and the pushrod is held in the cargo position with its bottom contact area on the projection, and the locking hook is held in its top end position by a stop.

7. Vehicle seat according to claim 1, wherein:
   a) the pushrod is biased against a backrest-side guide element when the release lever is in its unactuated position.

8. Vehicle seat according to claim 7, wherein:
   a) the backrest-side guide element is a guide roller axially projecting from the backrest frame.

9. Vehicle seat according to claim 1, wherein:
   a) the seat angle adjuster includes seat angle adjusters provided on both sides of the vehicle seat, and the pushrod is articulated to a connecting pipe running in a perpendicular direction that links the seat angle adjusters provided on both sides of the vehicle seat.

10. Vehicle seat according to claim 9, wherein:
    a) an easy-entry mechanism is provided on one seat side to set the easy-entry position and cargo position, and a lengthwise release device is provided on the other seat side to release the lengthwise lock of the vehicle seat in the easy-entry position.

* * * * *